(12) United States Patent
Carroll (10) Patent No.: US 11,460,216 B2
(45) Date of Patent: Oct. 4, 2022

(54) FLUSH MOUNT REGISTER WITH A REMOVABLE DAMPER BOX MECHANISM

(71) Applicant: DECOR GRATES INCORPORATED, Ajax (CA)

(72) Inventor: Owen Carroll, Ajax (CA)

(73) Assignee: DECOR GRATES INCORPORATED, Ajax (CA)

( * ) Notice: Subject to any disclaimer, the term of this patent is extended or adjusted under 35 U.S.C. 154(b) by 706 days.

(21) Appl. No.: 16/290,499

(22) Filed: Mar. 1, 2019

(65) Prior Publication Data

US 2019/0271485 A1 Sep. 5, 2019

Related U.S. Application Data

(60) Provisional application No. 62/637,694, filed on Mar. 2, 2018.

(51) Int. Cl.
| | | |
|---|---|---|
| *F24F 13/10* | (2006.01) | |
| *F24F 13/068* | (2006.01) | |
| *F24F 13/14* | (2006.01) | |
| *F24F 13/32* | (2006.01) | |

(52) U.S. Cl.
CPC ........ *F24F 13/068* (2013.01); *F24F 13/1413* (2013.01); *F24F 13/1426* (2013.01); *F24F 13/32* (2013.01); *F24F 2013/1473* (2013.01)

(58) Field of Classification Search
CPC .. F24F 13/068; F24F 13/1413; F24F 13/1426; F24F 13/32; F24F 2013/1473
USPC .......................................................... 454/290
See application file for complete search history.

(56) References Cited

U.S. PATENT DOCUMENTS

| | | | | |
|---|---|---|---|---|
| 770,326 A | * | 9/1904 | Slater ...................... | F24F 13/06 454/290 |
| 4,625,632 A | * | 12/1986 | Markman ........... | F24F 13/1486 29/890.12 |
| 5,551,915 A | * | 9/1996 | Schweikert ............. | F24F 13/06 454/290 |

* cited by examiner

*Primary Examiner* — Ko-Wei Lin
(74) *Attorney, Agent, or Firm* — Resolute Legal PLLC (57) ABSTRACT

A flush mount register for use within a vent opening in a flooring, the flush mount register comprising: a subfloor frame secured to a subfloor, wherein the subfloor supports flooring; a damper box mechanism supported by the subfloor frame; a floor substrate frame and a floor substrate tray secured and nested within the floor substrate frame and having a gap defined between the floor substrate frame and the floor substrate tray, and wherein the floor substrate frame is supported by the damper box mechanism; and wherein the floor substrate tray receives a flooring substrate, and wherein the floor substrate frame and the floor substrate tray are removable to permit access to the damper box mechanism.

26 Claims, 10 Drawing Sheets

FLUSH MOUNT REGISTER WITH A REMOVABLE DAMPER BOX MECHANISM

CROSS-REFERENCE TO RELATED APPLICATIONS

This application claims priority to U.S. Provisional Application Ser. No. 62/637,694 filed on Mar. 2, 2018.

FIELD OF INVENTION

The present invention relates to ventilation heating and cooling systems, and more particularly it relates to flush mount air registers.

DESCRIPTION OF THE RELATED ART

In forced air heating and cooling systems a fan associated with a furnace forces air through a duct system to distribute heated air or conditioned air throughout a building. Air emerges from outlets in the duct system, and the outlets generally include registers operable to regulate the flow of air. For registers which are situated in a floor, a grill is typically placed over the vent opening to provide an aesthetically pleasing appearance to the outlet. Normally, when installing flooring it is often desirable to include a register grill that also matches the flooring in order to give the flooring a homogeneous look. However, most flooring manufacturers and home improvement stores only have limited types and styles of register grills available, and end users are often forced to find the closest match to the flooring, and make do with their choice. Even if one was to consider custom manufacturing a limited number of register grills for a particular flooring, such a process may be impractical, expensive, and time consuming, as most manufacturers require minimum volumes to justify the cost of specialized tooling and dedicated personnel. In addition, given that there may be variations in flooring from batch to batch due to the nature of wood or tile, such matching may be difficult to achieve leading to inconsistencies in the overall flooring appearance.

It is an object of the present invention to mitigate or obviate at least one of the above-mentioned disadvantages.

SUMMARY OF THE INVENTION

In one of its aspects, there is provided a flush mount register for use within a vent opening in a flooring, the flush mount register comprising:
  a subfloor frame secured to a subfloor, wherein the subfloor supports flooring;
  a removable damper box mechanism supported by the subfloor frame;
  a floor substrate frame and a floor substrate tray secured and nested within the floor substrate frame and having a gap defined between the floor substrate frame and the floor substrate tray, and wherein the floor substrate frame is supported by the damper box mechanism; and
  wherein the floor substrate tray receives a flooring substrate, and
  wherein the floor substrate frame and the floor substrate tray are removable to permit access to the damper box mechanism.

In another of its aspects, there is provided a flush mount register comprising:
  a subfloor frame;
  a removable damper box mechanism supported by the subfloor frame;
  a floor substrate frame and a floor substrate tray secured and nested within the floor substrate frame and having a gap defined between the floor substrate frame and the floor substrate tray, and wherein the floor substrate frame is supported by the damper box mechanism; and
  wherein the floor substrate tray receives a flooring substrate, and
  wherein the floor substrate frame and the floor substrate tray are removable to permit access to the damper box mechanism.

In yet another of its aspects, there is provided a register system for use within a vent opening in a flooring, the flush mount register comprising:
  a subfloor frame secured to a subfloor, wherein the subfloor supports flooring;
  a floor substrate frame and a floor substrate tray secured and nested within the floor substrate frame and having a gap defined between the floor substrate frame and the floor substrate tray; and
  wherein the floor substrate tray receives a flooring substrate; and
  wherein the floor substrate frame and the floor substrate tray are supported by the subfloor frame.

Advantageously, the system comprises a subfloor frame, which is installed before the flooring material is installed; a removable damper box mechanism which rests inside the subfloor frame; a removable frame with a tray, which are both flush with the flooring, and can be used for flooring with various thicknesses e.g. 0.375 inches to 0.75 inches. The frame and tray are removable to allow access to the removable damper mechanism, and also permit regular cleaning and general maintenance thereof. In addition, all the system components are designed and dimensioned to be significantly lower than the industry standard heights to allow the various system components to fit inside the standard vents. Accordingly, the combined height of all the various system components is substantially close to the industry standard height of the damper mechanism alone, while not affecting the actual operation of the damper mechanism.

In addition, the system can be customized for installation in flooring with various floor thicknesses, by simply adjusting the height of the floor substrate frame such that floor substrate frame, and tray with floor substrate are flush with the rest of the flooring. Accordingly, there is no need multiple stock keeping units (SKUs) for each floor thickness or vent opening.

Furthermore, the system allows any flooring system to be matched regardless of the flooring material. For example, the flooring material may be wood, laminate, carpet, engineered products, tile, carpet and vinyl.

BRIEF DESCRIPTION OF THE DRAWINGS

Several preferred embodiments of the present invention will now be described, by way of example only, with reference to the appended drawings in which.

DETAILED DESCRIPTION OF EXEMPLARY EMBODIMENTS

The detailed description of exemplary embodiments of the invention herein makes reference to the accompanying block diagrams and schematic diagrams, which show the exemplary embodiment by way of illustration and its best mode. While these exemplary embodiments are described in sufficient detail to enable those skilled in the art to practice the invention, it should be understood that other embodiments may be realized and that logical and mechanical changes may be made. Thus, the detailed description herein is presented for purposes of illustration only and not of limitation. For example, the steps recited in any of the method or process descriptions may be executed in any order and are not limited to the order presented.

Moreover, it should be appreciated that the particular implementations shown and described herein are illustrative of the invention and its best mode and are not intended to otherwise limit the scope of the present invention in any way. Indeed, for the sake of brevity, certain sub-components of the individual operating components.

Figure 1A:
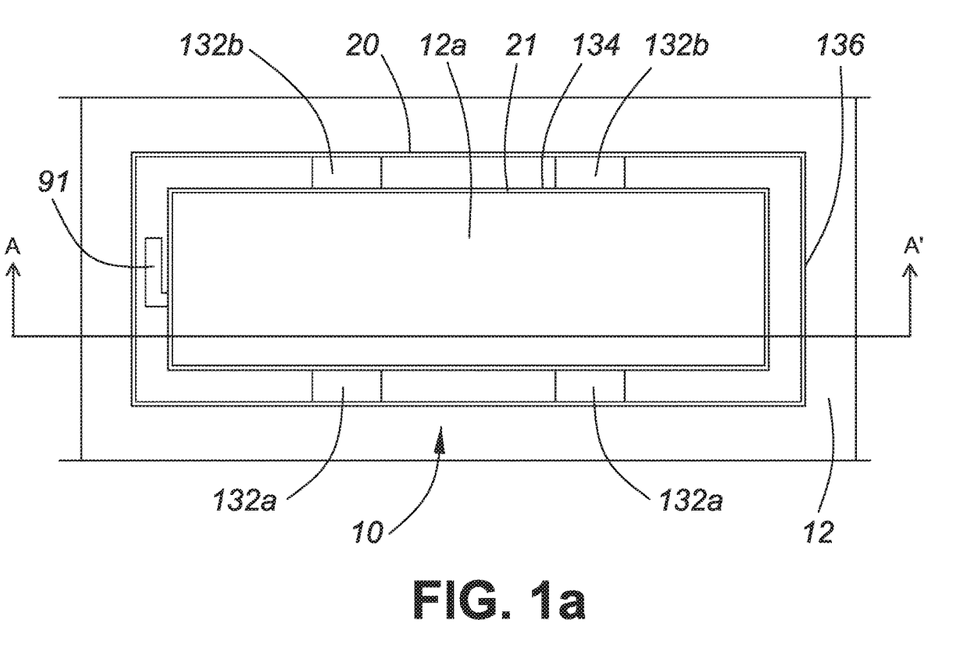
FIG. 1a shows a top view of a flush mount register system installed in a floor.
Figure 1B:
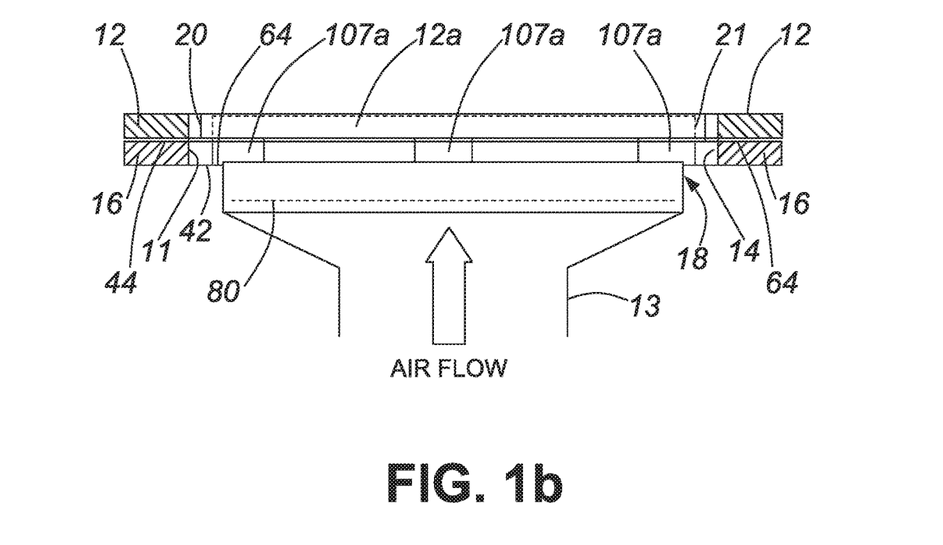
FIG. 1b shows a sectional view of the flush mount register system of FIG. 1, taken along line A-A'.
Figure 2A:
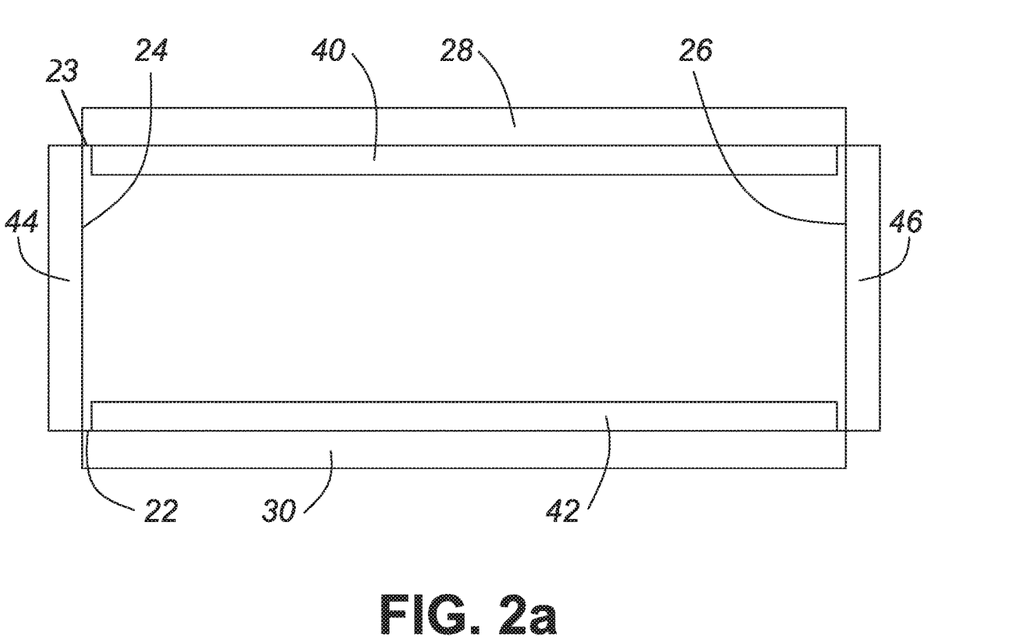
FIG. 2a shows a top view of a subfloor frame.
Figure 2B:
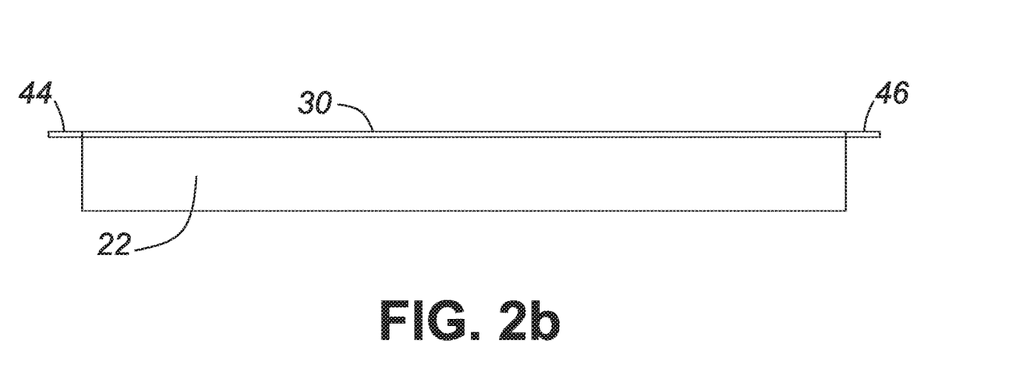
FIG. 2b shows a longitudinal side view of the subfloor frame.
Figure 2C:
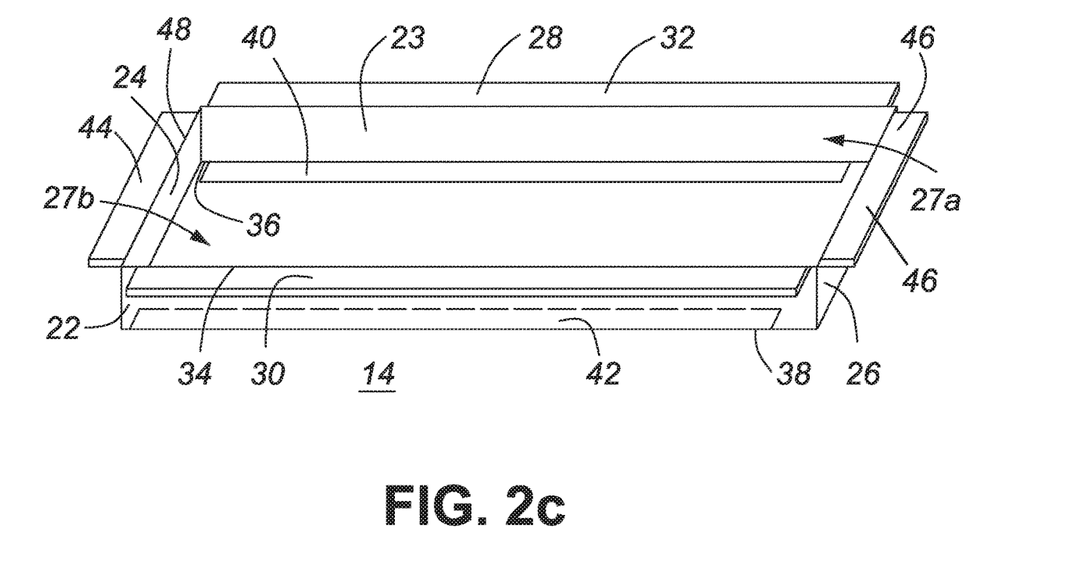
FIG. 2c shows a perspective view of the subfloor frame.
Figure 2D:
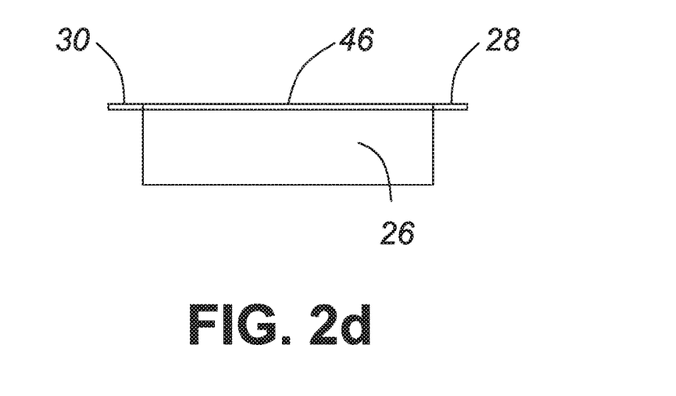
FIG. 2d shows a lateral side view of the subfloor frame.

Looking at FIGS. 1a and 1b there is shown flush mount register system 10 installed within opening 11 of flooring 12. Opening 11 is in fluid communication with duct 13 coupled to a HVAC system (not shown). Flush mount register 10 comprises subfloor frame 14 mounted securely on subfloor 16, removable damper box mechanism 18 nested within subfloor frame 14, and resting on removable damper box mechanism 18 is floor substrate frame 20 which supports floor substrate tray 21 with flooring substrate 12a securely affixed thereto.

Now referring to FIGS. 2a to 2d, subfloor frame 14 comprises first pair of longitudinally extending side walls 22, 23 and first pair of laterally extending sidewalls 24, 26, which are joined to form a rectangular shape with top opening 27a, and bottom opening 27b. Longitudinally extending walls 22, 23 comprise first pair of top tabs 28, 30, respectively, and top tabs 28, 30 extend outwardly and orthogonally from top edges 32, 34 of longitudinally extending walls 22, 23, respectively. Longitudinally extending walls 22, 23, also comprise bottom edges 36, 38, respectively, with bottom tabs 40, 42 extending inwardly from longitudinally extending walls 22, 23, such that bottom tabs 40, 42 face each other. Laterally extending sidewalls 24, 26 comprise second pair of top tabs 44, 46, respectively, and top tabs 44, 46 extend outwardly and orthogonally from top edges 48, 50 of laterally extending sidewalls 24, 26 respectively.

Subfloor frame 14 is introduced into subfloor opening 11, such that longitudinally extending walls 22, 23 and laterally extending sidewalls 24, 26 are contained within duct 13, and first pair of top tabs 28, 30 and second pair of top tabs 44, 46 rest on subfloor 16. First pair of top tabs 28, 30 and second pair of top tabs 44 include orifices for receiving fastening means, such as screws or nails, among others, to secure subfloor frame 14 to subfloor 16.

Looking at FIGS. 3a to 3d, there is shown removable damper 18 comprising second pair of longitudinally extending side walls 50, 52, and second pair of laterally extending sidewalls 54, 56, which are joined to form a rectangular shape with damper top opening 57a, and damper bottom opening 57b. Longitudinally extending side walls 50, 52, also comprise top edges 58, 60, respectively, with third pair of tabs 62, 64 extending outwardly and orthogonally from longitudinally extending walls 50, 52, respectively. Longitudinally extending walls 50, 52, also comprise bottom edges 66, 68, respectively, with bottom tabs 70, 72 extending inwardly from longitudinally extending walls 50, 52, such that bottom tabs 70, 72, face each other.

Removable damper box mechanism 18 further comprises damper mechanism 80 comprising dampers 82, 84 operable to substantially open and close bottom opening 57b, to dispose damper box mechanism 18 between a closed state, partially open state, and an open state. Dampers 82, 84 are generally rectangular-shaped and comprise opposed longitudinal edges and opposed lateral edges and are caused to rotate about laterally extending sidewalls 54, 56 by an actuating mechanism. Actuating mechanism comprises interconnection mechanism 90 interconnecting dampers 82, 84 to cause dampers 82, 84 to rotate in synchrony, thereby opening and closing bottom opening 57b, to regulate air flow from duct 13. For example, actuating mechanism further comprises lever mechanism 91 that is operable to place dampers cause dampers 82, 84 between various degrees of open states or closed states. Lever mechanism 91 extends in gap 136 is defined between fourth laterally extending walls 104, 105 and fifth longitudinally extending walls 124, and therefore lever mechanism 91 can be accessed by a user and is operable without removing floor substrate frame 20 and/or floor substrate tray 21. In another implementation, the length of lever mechanism may be cut to adjust for the thickness of the floor.

Figure 3A:
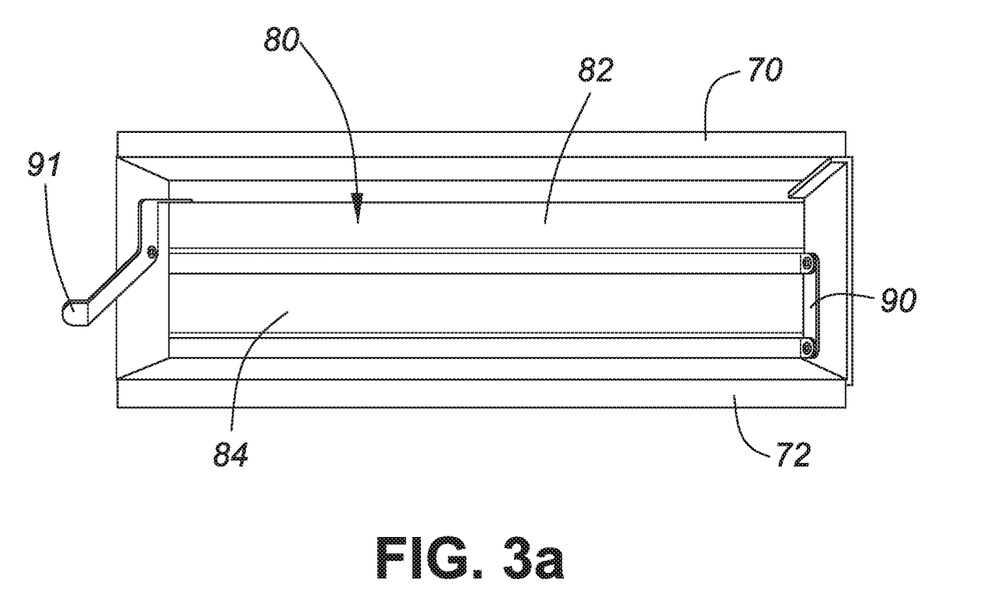
FIG. 3a shows a top perspective view of a damper box mechanism, in a closed position.
Figure 3B:
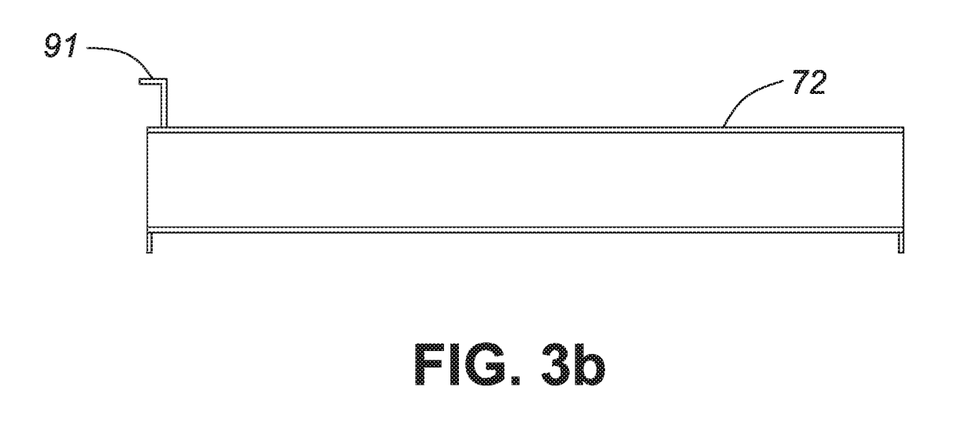
FIG. 3b shows a longitudinal side view of the damper box mechanism.

In a closed state of damper box mechanism 18, dampers 82, 84 are substantially perpendicular to laterally extending walls 54, 56, respectively. As such, dampers 82, 84 overlap each other, such that a portion of longitudinal edge of damper 82 rests on topside of bottom tab 70 and a portion of longitudinal edge of damper 84 abuts underside of bottom tab 72, and a portion of longitudinal edge of damper 84 overlaps longitudinal edge of damper 82.

Figure 3C:
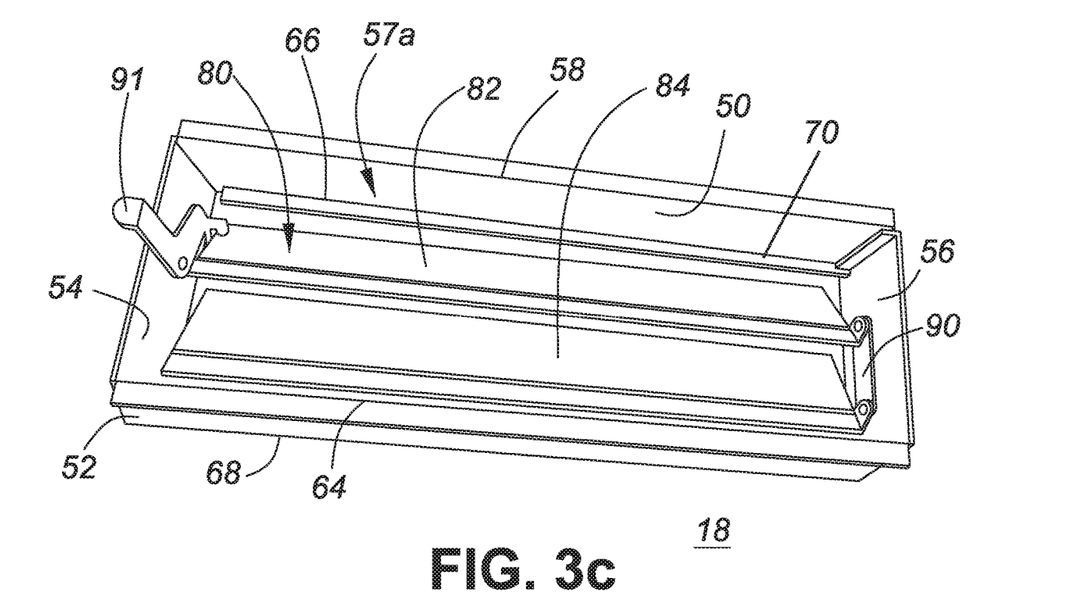
FIG. 3c shows a top perspective view of the damper box mechanism, in a partially open position.

In a partially open state or partially closed state of damper box mechanism 18, opposed longitudinal edges of dampers 82, 84 are angled towards longitudinally extending walls 50, 52, respectively.

Figure 3D:
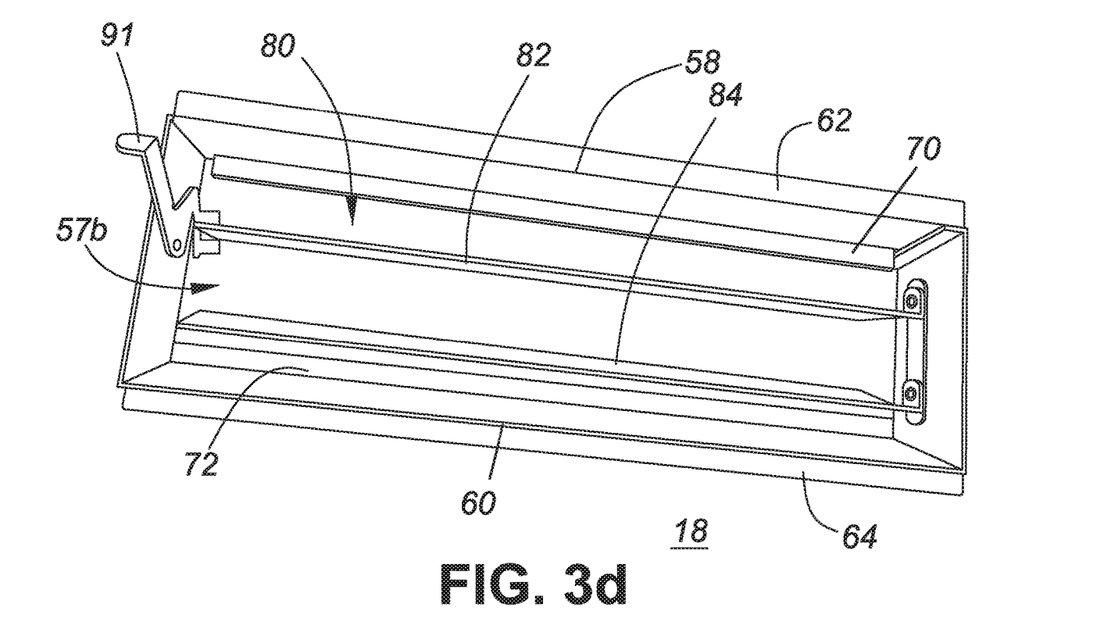
FIG. 3d shows a top perspective view of the damper box mechanism, in an open position.
Figure 4A:
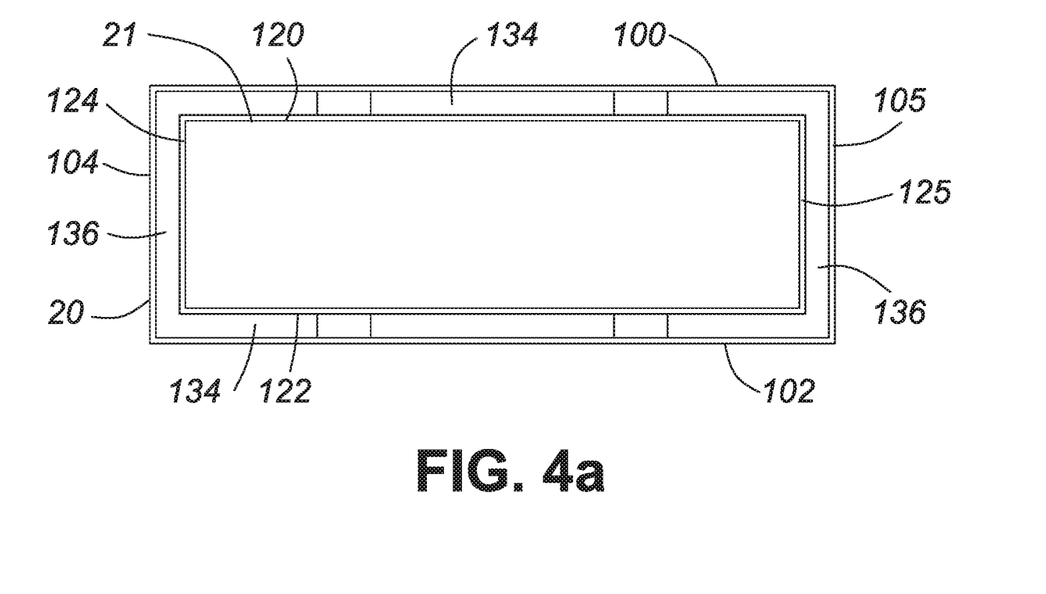
FIG. 4a shows a top view of a floor substrate frame.
Figure 4B:
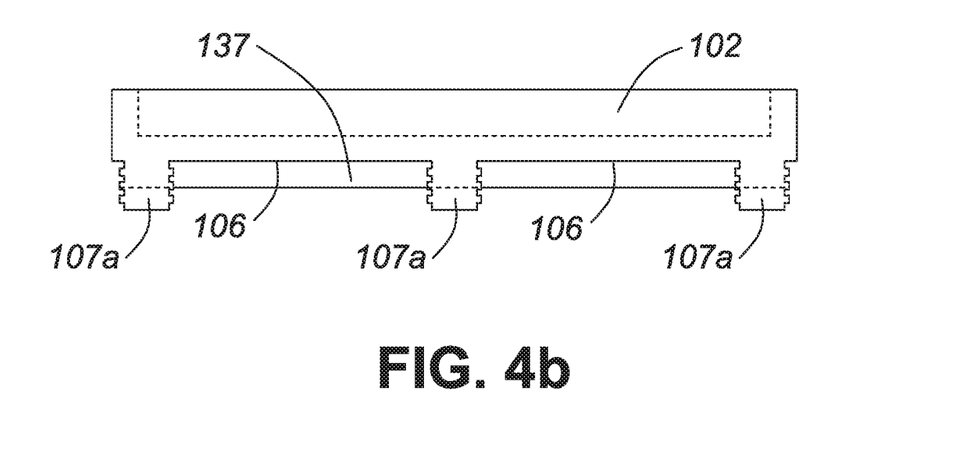
FIG. 4b shows a longitudinal side view of the floor substrate frame.
Figure 4C:
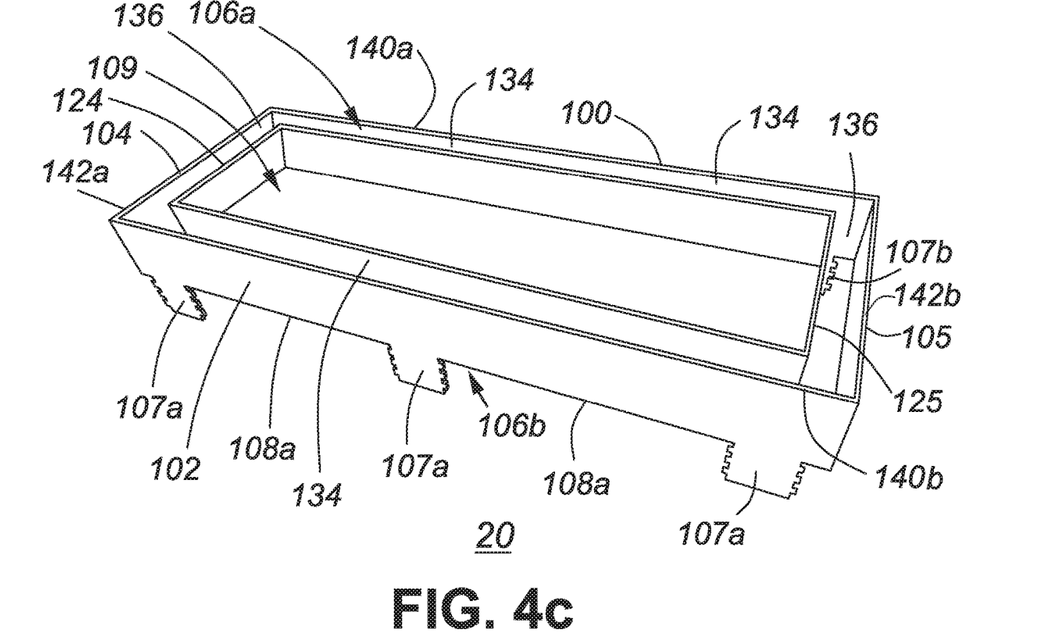
FIG. 4c shows a perspective view of the floor substrate frame.
Figure 4D:
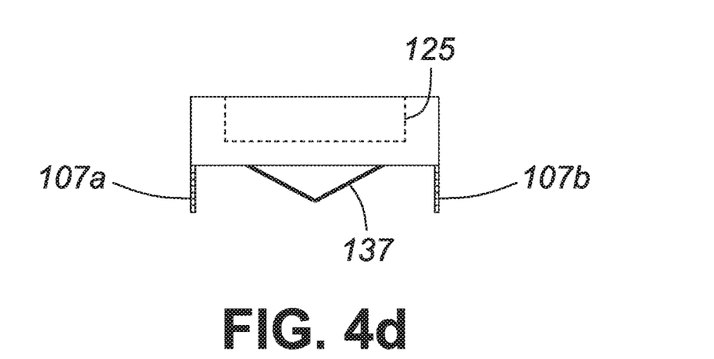
FIG. 4d shows a lateral side view of the subfloor frame.

In a fully open state of damper box mechanism 18, dampers 82, 84 are substantially parallel to longitudinally extending walls 50, 52, respectively, and opposed lateral edges are substantially parallel to laterally extending walls 54, 56, respectively.

Figure 6:
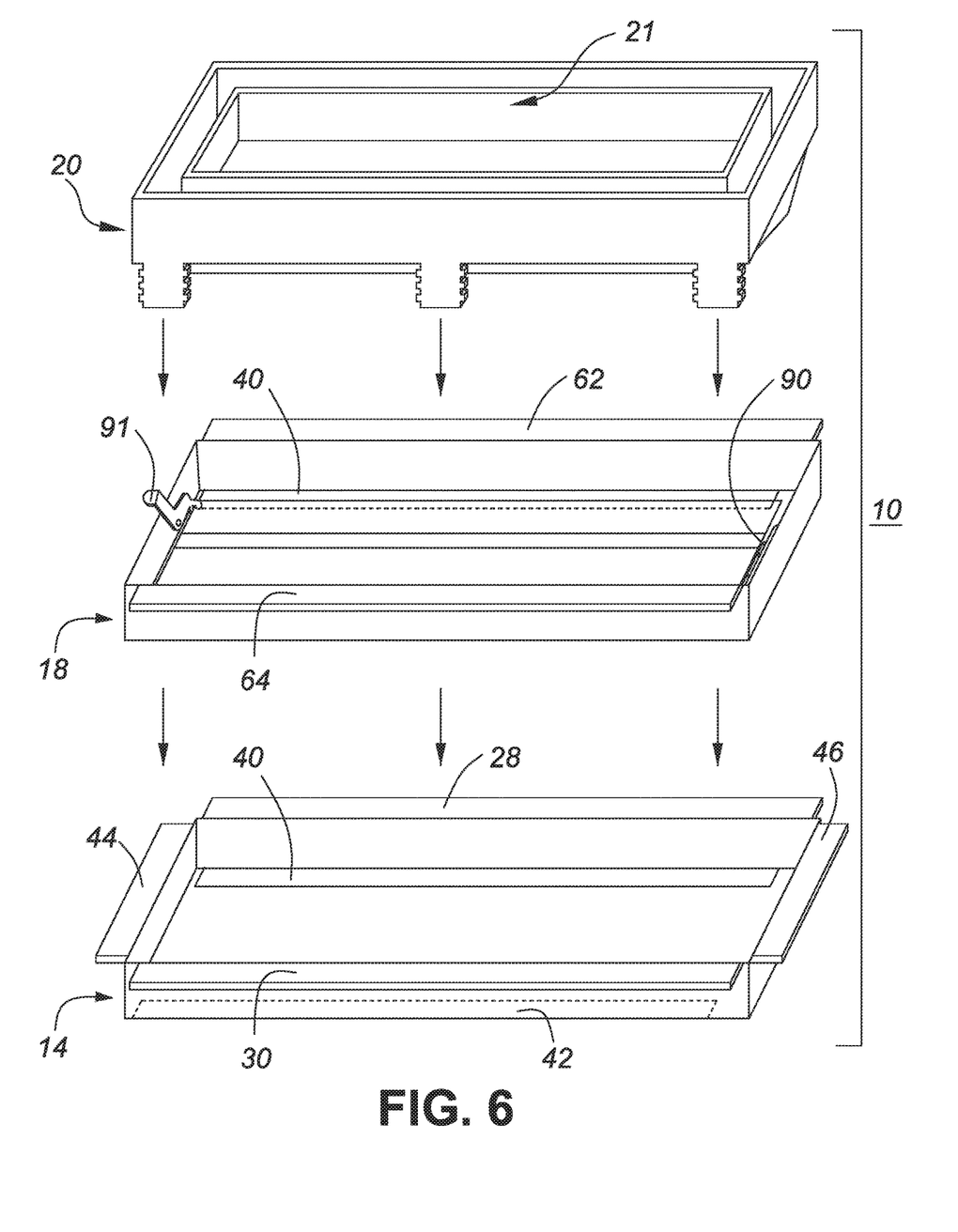
FIG. 6 shows an exploded view of the flush mount register system.

Generally, removable damper box mechanism 18 is suitably dimensioned to be introduced into subfloor frame 14, such that longitudinally extending walls 50, 52 travel past bottom tabs 40, 42 until third pair of top tabs 62, 64 of removable damper box mechanism 18 abut bottom tabs 40, 42 of subfloor frame 14, to come to a rest, as shown in FIG. 6.

Now looking at FIGS. 4a to 4d, there is shown floor substrate frame 20 which receives floor substrate tray 21. Floor substrate frame 20 comprises fourth longitudinally extending walls 100, 102 and laterally extending walls 104, 105, joined together to form a rectangular shape, with top opening 106a and bottom opening 106b. Fourth longitudinally extending walls 100, 102 comprise a plurality of legs 107a, 107b, respectively, extending from bottom edges 108a, 108b of longitudinally extending walls 100, 102, respectively. Legs 107a and 107b are adjustable to match the height of flooring 12 or the thickness of flooring 12. For example, legs 107a and 107b comprise a ruler legend and/or break-away tabs useful for adjusting the height floor substrate frame 20 when installed on removable damper box mechanism 18 to match the height of flooring 12 or the thickness of flooring 12, as will be described below. Legs 107a and 107b may therefore be frangible, however, the break-away tabs comprise an optimal thickness for both strength and easy of breaking away or cutting legs 107a, 107b with regular wire or metal cutting tools.

Figure 5A:
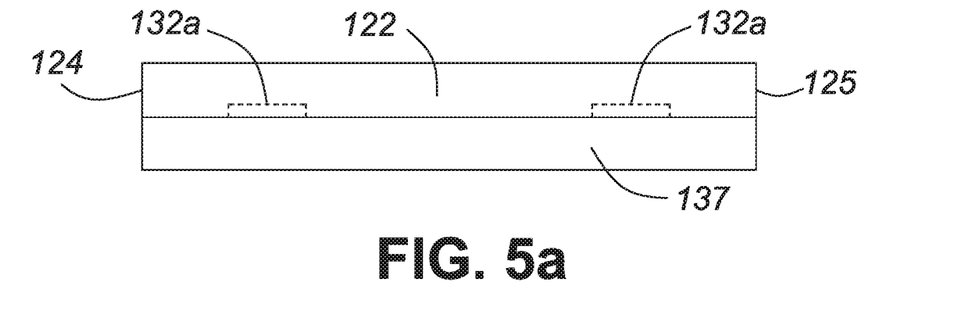
FIG. 5a shows a longitudinal side view of a floor tray.
Figure 5B:
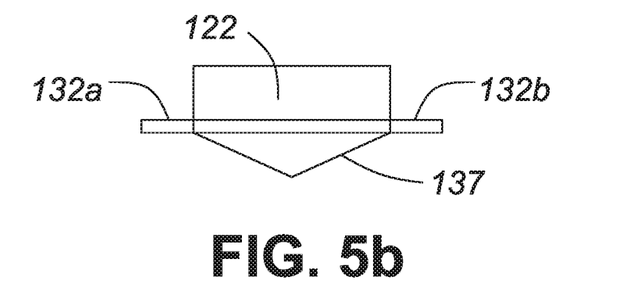
FIG. 5b shows a lateral side view of the floor tray.
Figure 5C:
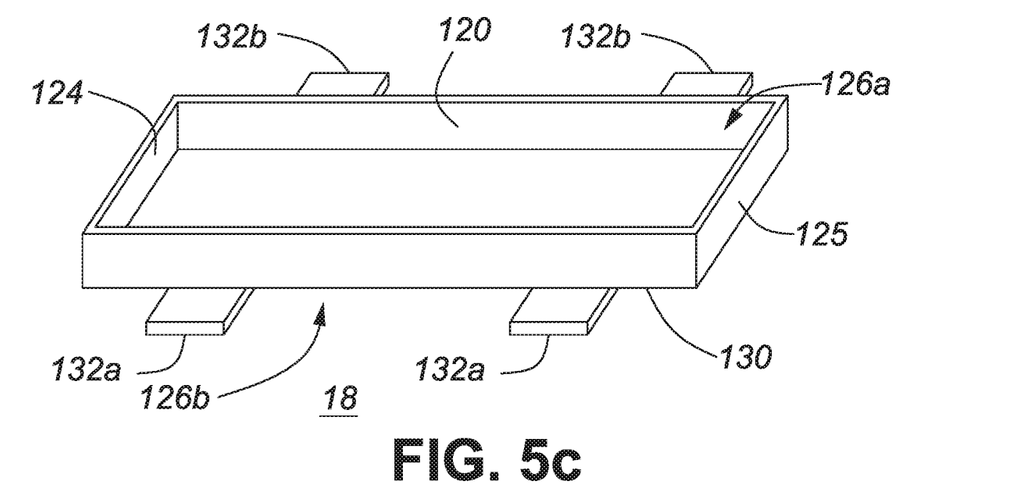
FIG. 5c shows a perspective view of the floor tray.

FIGS. 5a to 5c show different views of floor tray 21 in more detail. As can be seen, floor substrate tray 21 comprises fifth longitudinally extending walls 120, 122 and laterally extending walls 124, 125, joined together to form a rectangular shape, with top opening 126a and bottom opening 126b. Bottom edges of fifth longitudinally extending walls 120, 122 comprise struts 132a, 132b, respectively, extending outwardly and perpendicularly away from fifth longitudinally extending walls 120, 122. Struts 132a, 132b, are secured, joined, or welded to fourth longitudinally extending walls 100, 102, such that gap 134 is defined between fourth longitudinally extending walls 100, 102 and fifth longitudinally extending walls 120, 122, respectively; and gap 136 is defined between fourth laterally extending walls 104, 105 and fifth longitudinally extending walls 124, 125, respectively. Air from duct 13 is forced through gaps 134 and 136 into the rooms. A bottom of the floor substrate tray 21 comprises an air deflector 137 for directing air towards gap 134 between the longitudinally extending walls 100, 102 of the floor substrate frame 20 and the floor substrate tray 21, thereby increasing air flow through the gap 134. In another implementation, an air deflector 137 may be configured to directing air towards the gap 136 between the laterally extending walls 104, 105 of the floor substrate frame 20 and the floor substrate tray 21, thereby increasing air flow through the gap 136. In yet another implementation, an air deflector 137 may be configured to directing air towards the gaps 134 and 136.

With floor substrate tray 21 secured to floor substrate frame 20, floor substrate 12a is dimensioned to fit within floor substrate tray 21, such that floor substrate tray 21 and floor substrate frame 20 are flush with flooring 12. Subsequently, floor substrate tray 21 housing floor substrate 12a is introduced into sub-floor frame 14 such that legs 107a, 107b rest on third pair of tabs 62, 64, respectively, of removable damper box mechanism 18. Top edges 140a, 140b of longitudinally extending walls 100, 102 and top edges 142a, 142b of laterally extending walls 104, 105 of floor substrate frame 20 are lined up with surrounding flooring 12, and depending on the thickness of flooring 12, the length of legs 107a, 107b may require shortening. Using the ruler legend stamped on each leg 107a or 107b, portions of legs 107a, 107b may be cut to the desired length such that floor substrate frame 20 is flush with flooring 12, and hence floor substrate tray 21 with floor substrate 12a is also flush with flooring 12.

Accordingly, the height adjustment of substrate frame 20 allows full customization of flush mount register system 10 to match the various thicknesses of flooring 12, and so flush mount register system 10 can be easily installed, without having to level any other component of flush mount register system 10, such as subfloor frame 14, or removable damper box mechanism 18.

With legs 107a, 107b resting on removable damper box mechanism 18, an opening is defined between legs 107a and top tab 62; and another opening is defined between legs 107b and top tab 64. Yet another opening is defined between laterally extending wall 104 and top edge 154 of laterally extending wall 54 of removable damper box mechanism 18, and yet another opening is defined between laterally extending wall 105 and top edge 156 of laterally extending wall 56 of removable damper box mechanism 18. These openings further allow air to escape from the register into the target space. As such, floor substrate frame 20 with floor substrate tray 21 and floor substrate 12a are removable to allow access to the removable damper box mechanism 18. In addition, subfloor frame 14, removable damper box mechanism 18, floor substrate frame 20, and floor substrate tray 21 are dimensioned to fit inside industry standard vent openings 11. Accordingly, the combined height of subfloor frame 14, removable damper box mechanism 18, floor substrate frame 20, and floor substrate tray 21 is substantially close to the industry standard height of a commercial damper mechanism alone, while not affecting the actual operation of the damper mechanism. Accordingly, when flush mount register system 10 is fully assembled, since subfloor frame 14 is secured to subfloor 16 then flush mount register system 10 is capable of supporting similar forces imposed on flooring 12, such as those from furniture, objects or people. In addition, legs 107a, 107b contribute to the structural integrity and strength of flush mount register system 10 to support the afore-mentioned forces.

Figure 7:
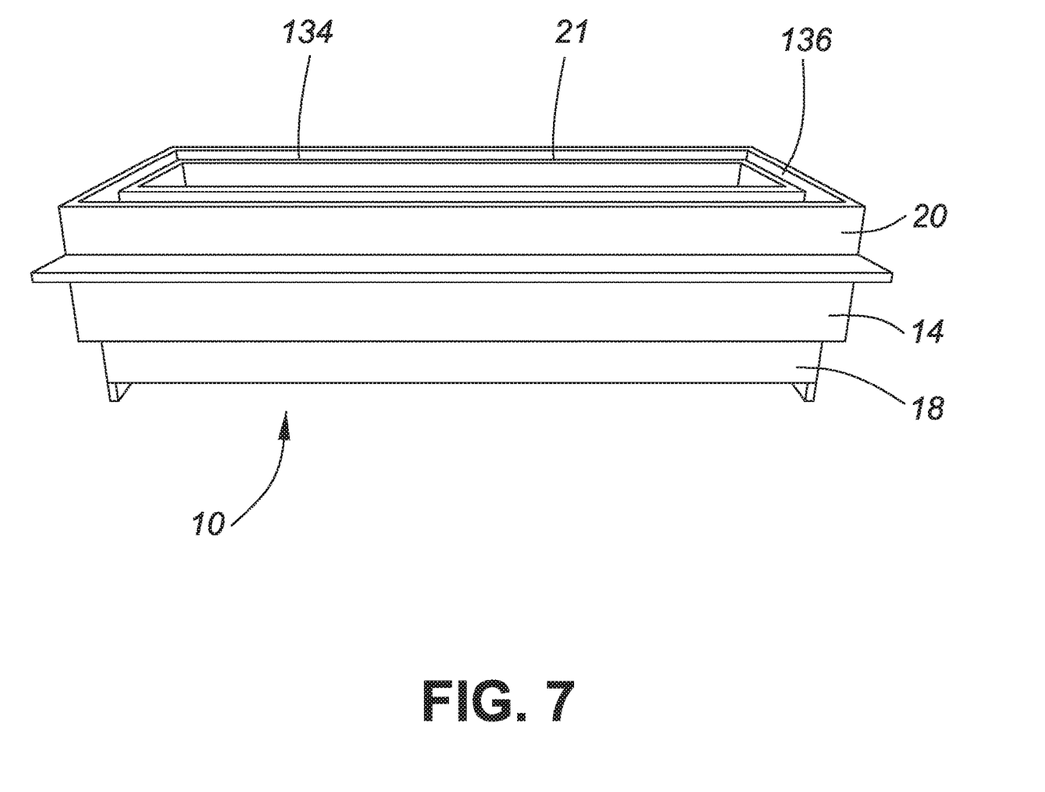
FIG. 7 shows a perspective view of the flush mount register system.

FIG. 6 shows an exploded view of flush mount register system 10, illustrating the arrangement of the various components of the flush mount register system 10. FIG. 7 shows a view of flush mount register system 10, when assembled and having the various components in place.

In another implementation, damper box mechanism includes a single damper or any number of dampers, depending on the size of the opening 11, application, desired results, and user preferences.

In another implementation, while the system 10 is primarily meant to be installed at the same time as the flooring material, it can be modified to allow use of leftover flooring such that the finished product matches the existing flooring material. The modification entails a flat frame, which can slot onto the subfloor frame to turn it into a finished top floor frame.

In another implementation, floor substrate tray 21 is removably secured to floor substrate frame 20.

Those skilled in the art will recognized that the dimensions shown in the drawings are exemplary in nature only, as these dimensions are applicable in one exemplary implementation e.g. for 4"×10" vent openings, and therefore can vary depending on the requirements for a particular application, desired results, and user preferences. For example, flush mount register system 10 may be dimensioned to fit any opening, accordingly exemplary sizes of flush mount register system 10 may be 2"×12" and 4"×12".

In another implementation, while the system 10 is installed in a ceiling or a wall.

The preceding detailed description of exemplary embodiments of the invention makes reference to the accompanying drawings, which show the exemplary embodiment by way of illustration. While these exemplary embodiments are described in sufficient detail to enable those skilled in the art to practice the invention, it should be understood that other embodiments may be realized and that logical and mechanical changes may be made. For example, the steps recited in any of the method or process claims may be executed in any order and are not limited to the order presented. Further, the present invention may be practiced using one or more servers, as necessary. Thus, the preceding detailed description is presented for purposes of illustration only and not of limitation, and the scope of the invention is defined by the preceding description, and with respect to the attached claims.

The invention claimed is:

1. A flush mount register for use within a vent opening in a flooring, the flush mount register comprising:
a subfloor frame secured to a subfloor, wherein the subfloor supports the flooring;
a removable damper box resting on the subfloor frame;
a floor substrate frame;
a floor substrate tray secured within the floor substrate frame by struts extending from the floor substrate tray to the floor substrate frame such that a continuous peripheral gap is defined around the floor substrate tray between a top edge of the floor substrate frame and the floor substrate tray, wherein the continuous peripheral gap allows passage of air from the vent opening, and wherein the floor substrate frame and the nested floor substrate tray are supported by the removable damper box; and
wherein the floor substrate tray receives a flooring substrate, and
wherein the floor substrate frame and the floor substrate tray are removable to permit access to the removable damper box.

2. The flush mount register of claim 1, wherein the subfloor frame comprises a first pair of longitudinally extending side walls and a first pair of laterally extending sidewalls which are joined to form a rectangular shape with a first top opening and a second bottom opening, and wherein the first pair of longitudinally extending side walls each comprises a first top tab extending outwardly and orthogonally therefrom at the first top opening, and the first pair of laterally extending sidewalls each comprises a second top tab extending outwardly and orthogonally therefrom at the first top opening; and wherein the first pair of longitudinally extending side walls each comprises a bottom tab extending inwardly and orthogonally such that the bottom tabs face each other.

3. The flush mount register of claim 2, wherein the first top tabs and the second top tabs are secured to the subfloor.

4. The flush mount register of claim 3, wherein the removable damper box comprises a second pair of longitudinally extending side walls and a second pair of laterally extending sidewalls which are joined to form a rectangular shape with a damper top opening and a damper bottom opening; and wherein the second pair of longitudinally extending side walls each comprises a first damper top tab extending outwardly and orthogonally therefrom at the damper top opening; and wherein the second pair of longitudinally extending side walls each comprises a bottom damper tab extending inwardly and orthogonally such that the bottom damper tabs face each other.

5. The flush mount register of claim 4, wherein the first damper top tabs rest on the first top tabs of the subfloor frame to support the removable damper box.

6. The flush mount register of claim 5, wherein the floor substrate frame comprises legs, and wherein the legs are supported by the removable damper box.

7. The flush mount register of claim 6, wherein the legs are dimensioned such that a top edge of the floor substrate frame and a top edge of the floor substrate tray are flush with the flooring.

8. The flush mount register of claim 7, wherein the legs comprise a plurality of break-away tabs for adjusting the length of the legs.

9. The flush mount register of claim 8, wherein the removable damper box comprises an actuator to urge dampers of the removable damper box to place the damper bottom opening between a closed state, a partially open state, and an open state, wherein the actuator is accessible by a user.

10. The flush mount register of claim 9, wherein the actuator comprises a lever and an interconnector between dampers, wherein the lever and the interconnector are operable to urge the dampers to place the damper bottom opening between the closed state, the partially open state, and the open state, and wherein the lever extends in the continuous peripheral gap for access by the user for operation without removing the floor substrate frame and floor substrate tray.

11. The flush mount register of claim 9, wherein a bottom of the floor substrate tray comprises an air deflector for directing air towards the continuous peripheral gap between a third pair of longitudinally extending walls of the floor substrate frame and the floor substrate tray, thereby increasing air flow through the continuous peripheral gap.

12. A flush mount register comprising:
a subfloor frame;
a removable damper box supported by the subfloor frame;
a floor substrate frame;
a floor substrate tray secured within the floor substrate frame by struts extending from the floor substrate tray to the floor substrate frame such that a continuous peripheral gap is defined around the floor substrate tray between a top edge of the floor substrate frame and the floor substrate tray, and wherein the floor substrate frame is supported by the removable damper box; and
wherein the floor substrate tray receives a flooring substrate, and
wherein the floor substrate frame and the floor substrate tray are removable to permit access to the removable damper box.

13. The flush mount register of claim 12, wherein the subfloor frame is mounted in a vent opening defined within a subfloor.

14. The flush mount register of claim 13, wherein the removable damper box comprises a damper box opening and at least one damper operable to place the damper box opening between a closed state, a partially open state, and an open state.

15. The flush mount register of claim 14, wherein the removable damper box comprises an actuator to urge the at least one damper to place the damper box opening between the closed state, the partially open state, and the open state, wherein the actuator is accessible by a user.

16. The flush mount register of claim 15, wherein the actuator comprises a lever that is operable to urge the at least one damper to place the damper box opening between the closed state, the partially open state, and the open state, and wherein the lever extends in the continuous peripheral gap for access by the user for operation without removing the floor substrate frame and floor substrate tray.

17. The flush mount register of claim 12, wherein the floor substrate frame and the floor substrate tray are coplanar, such that the flooring substrate is flush with a surrounding flooring.

18. The flush mount register of claim 17, wherein the floor substrate frame comprises adjustable legs for adjusting the height of the floor substrate frame to match the height of the flooring or the thickness of the flooring.

19. The flush mount register of claim 18, wherein the adjustable legs are supported by the removable damper box, and wherein the removable damper box is supported by the subfloor frame, whereby similar forces imposed on the surrounding flooring are withstood by the flooring substrate within the floor substrate tray.

20. The flush mount register of claim 19, wherein the adjustable legs are frangible.

21. The flush mount register of claim 16, wherein a bottom of the floor substrate tray comprises an air deflector for directing air towards the continuous peripheral gap.

22. A register system for use within a vent opening in a flooring, comprising:
 a subfloor frame secured to a subfloor, wherein the subfloor supports the flooring;
 a floor substrate frame and a floor substrate tray secured and nested within the floor substrate frame, wherein a continuous peripheral gap is defined between the floor substrate frame and the floor substrate tray;
 wherein the floor substrate tray receives a flooring substrate;
 wherein the floor substrate frame and the floor substrate tray are supported by the subfloor frame, and
 wherein the floor substrate frame comprises adjustable legs adaptable to cause the floor substrate frame and the flooring substrate to be coplanar with the flooring.

23. The register system of claim 22, further comprising a removable damper box with a damper box opening and at least one damper, wherein the floor substrate frame and the floor substrate tray are supported by the removable damper box.

24. The register system of claim 23, wherein the removable damper box comprises an actuator to place the damper box opening between a closed state, a partially open state, and an open state, wherein the actuator is accessible by a user, and wherein the actuator comprises a lever that is operable to urge the at least one damper to place the damper box opening between the closed state, the partially open state, and the open state, and wherein the lever extends in the continuous peripheral gap for access by the user for operation without removing the floor substrate frame and floor substrate tray.

25. The flush mount register of claim 22, wherein a bottom of the floor substrate tray comprises an air deflector for directing air towards the continuous peripheral gap between a pair of longitudinally extending walls of the floor substrate frame and the floor substrate tray.

26. The flush mount register of claim 1, wherein a top edge of the floor substrate frame and a top edge of the floor substrate tray are flush with the flooring.

\* \* \* \* \*